United States Patent
Cai et al.

(10) Patent No.: US 7,103,319 B2
(45) Date of Patent: Sep. 5, 2006

(54) PHYSICAL RANDOM ACCESS CHANNEL POWER CONTROL METHOD FOR MULTIMEDIA BROADCAST/MULTICAST SERVICE

(75) Inventors: Zhijun Cai, North Richland Hills, TX (US); Robert M. Harrison, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 413 days.

(21) Appl. No.: 10/437,220

(22) Filed: May 12, 2003

(65) Prior Publication Data

US 2004/0229572 A1    Nov. 18, 2004

(51) Int. Cl.
*H04B 1/00* (2006.01)
*H04B 7/00* (2006.01)

(52) U.S. Cl. .................................. 455/69; 455/522
(58) Field of Classification Search ................ 455/522, 455/69; 370/329, 335, 336
See application file for complete search history.

(56) References Cited

U.S. PATENT DOCUMENTS

| | | | |
|---|---|---|---|
| 5,881,368 A | 3/1999 | Grob et al. | |
| 6,374,085 B1* | 4/2002 | Saints et al. | 455/69 |
| 2001/0046877 A1* | 11/2001 | Ohkubo et al. | 455/522 |
| 2003/0096631 A1* | 5/2003 | Kayama et al. | 455/522 |
| 2003/0157952 A1* | 8/2003 | Sarkkinen et al. | 455/522 |

* cited by examiner

*Primary Examiner*—Matthew D. Anderson
*Assistant Examiner*—Lewis West
(74) *Attorney, Agent, or Firm*—Kevin D. Wills (57) ABSTRACT

In a telecommunication system (10) for providing multimedia broadcast services to many user equipments (40–45), a physical random access channel (39) is provided for uplink transmission of power control information from the user equipments to a radio site (30, 35). Based upon a comparison of signal-to-noise ratios (53) each particular user equipment sends (55) or inhibits from sending a power control signal to the radio site to which it is coupled. When the radio site of the telecommunication system detects a power control signal (73), the radio site adjusts the transmission power of a broadcast channel intended for reception by multiple user equipments (75) to be incrementally greater than the previous power (81). For lack of detection of a power control signal, adjusts the transmission power of a broadcast channel to be incrementally lower than the previous power.

24 Claims, 6 Drawing Sheets

PHYSICAL RANDOM ACCESS CHANNEL POWER CONTROL METHOD FOR MULTIMEDIA BROADCAST/MULTICAST SERVICE

BACKGROUND OF THE INVENTION

The present invention pertains to power control in mobile telecommunications systems and more particularly to mobile channel power control for multimedia broadcast and multicast ("MBMS") services.

Mobile telecommunications systems transmit information wirelessly over the air. Power of the transmitted signals is a driving consideration in today's mobile telecommunication services since the power varies with the distance between the mobile telecommunication station and the user's equipment.

Today multimedia services, which are broadcast wirelessly, require large amounts of power. The power required to serve multiple users for multimedia functions can be as high as 50% of the power of the mobile telecommunication cell site.

Typical mobile telecommunications channels are switched between a dedicated channel and broadcast channels to support multimedia services. The switching is based upon the number of users of a particular multi-media service. The switching requires complex signaling. Switching furthermore is slow and uses over-the-air resources inefficiently, such as soft handoffs. Multimedia cells must be turned off when there are no users served by the cell in order to conserve power for the remainder of channels in the mobile telecommunication system, which requires that users be tracked and counted.

Accordingly, it would be highly advantageous to have methodology for controlling power for cell sites which serve point-to-point and point-to-multipoint multimedia services.

DESCRIPTION OF THE PREFERRED EMBODIMENT OF THE INVENTION

Figure 1:
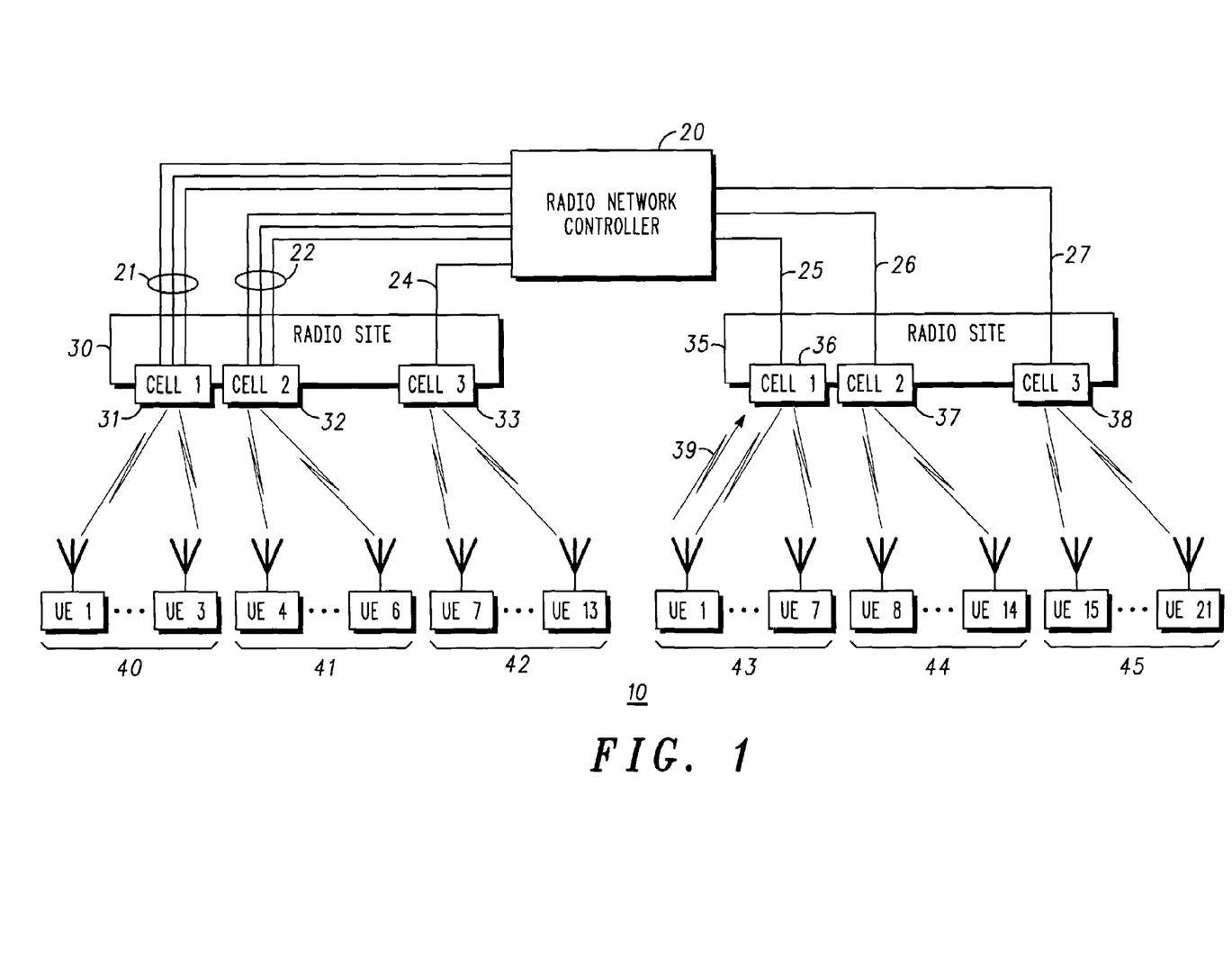
FIG. 1 is a block diagram of a mobile telecommunication system including a radio network controller in accordance with the present invention.

Referring to FIG. 1, a mobile telecommunication network 10 is shown. The radio network of the mobile telecommunication system includes a radio network controller 20 and radio sites 30 and 35. Radio network controller 20 is coupled to radio sites 30 and 35 by a number of links 21, 22, 24–27. Radio network controller (RNC) 20 controls the switching between radio sites 30 and 35 and other telecommunication systems or networks (not shown). Radio sites 30 and 35 are each shown, by example, as having three cells, although many more cells may be served by each radio site.

Each radio site 30 and 35 includes antennas and interface equipment for coupling various user equipment 40–45 and the associated users to the RNC 20 and the telecommunication networks worldwide. Cell 1 of radio site 30 has three distinct user equipments 40 coupled over the air via links 21 wirelessly to the RNC 20. Similarly, cell 2 of radio site 30 has three user equipments 41 coupled via links 22 to RNC 20. These couplings are a point-to-point connection serviced by a data channel of the RNC 20. That is, one data channel exists for each user equipment from RNC 20 through radio site 30 to the particular user equipment of groups 40 or 41, for example. The wireless links from cell 31 to UE1-3 and cell 2 to UE4-6 are set up as uni-cast or point-to-point connections since at a particular time there may be an insufficient number of user equipments to justify a multicasting arrangement. Each of the users (not shown) are assumed to be receiving multimedia broadcast services via the user equipment 40–45. Point-to-point connections as demonstrated by cells 31 and 32 to user equipments 40 and 41 respectively increase the overhead on the links 21 and 22. These point-to-point connections of cells 31 and 32 to user equipments 40 and 41 are made because the number of users, three for each cell, is relatively small.

For larger groups as shown for cell 33 of radio site 30 and user equipment 42 which includes seven users, a point to multipoint configuration is shown for the multimedia broadcast. That is, since each of the user equipments 42 is receiving the same multimedia broadcast, one link between RNC 20 and cell 33 of radio site 24 is established. Similarly, for larger user equipment groups 43, 44 and 45, the RNC 20 established point-to-multipoint links 25, 26 and 27 respectively which couple the RNC to cells 36, 37 and 38 of radio site 35. Cells 36, 37 and 38 then perform a point-to-multipoint broadcast to each of the user groups 43, 44 and 45 respectively. User equipment 43 includes seven user equipments, user group 44 includes seven user equipments and user group 45 includes seven user equipments. The point-to-multipoint broadcasting achieves certain economies if the number of user equipments is relatively high.

For radio site 30 there were three links or transport bearers in each group 21 and 22 and a point-to-multipoint link 24 for a total of seven transport bearer links. This is contrasted with three transport bearer links 25–27 shown coupling RNC 20 to radio site 35. As a result of the point-to-multipoint configuration more user equipments were served 21 versus 13 in radio site 30. Furthermore, bandwidth consumed by the transport bearer links 21–24 and 25–27 shows a reduction of about 50% in the configuration depicted by radio site 35 and user equipments 43–45 over radio site 30 and user equipments 40–42.

The power control arrangements for radio sites 30 and 35 for point-to-point and particularly for point-to multipoint configurations is of the utmost concern in providing the multimedia broadcast services. Present power control arrangements send measurement reports from the user equipment to the radio site and to the RNC. For large numbers of user equipment which is common for the point-to-multipoint services a significant overhead is incurred on the uplink from the user equipment to both the radio site and the RNC. Furthermore this overhead increases proportionately to the number of users requiring multimedia broadcast services. In addition the delay between the power control request and the action taken by the RNC takes a considerable amount of time due to the necessity of sending power control requests and actions to the RNC and waiting for the RNC to respond to the user equipment.

For point-to-multipoint or point-to-point multimedia broadcast services, the present invention includes the use of a physical random access channel (PRACH) 39. Note that, any channel supporting random access may support the power control commands of the invention; this channel need not be an existing random access channel (such as one used for call initiation or short message transmissions).

The PRACH 39 is an uplink channel which serves to provide various uplink messages from the user equipment 40–45 to radio sites 30 and 35. User equipments may transmit on the PRACH at will, without requesting access from the radio network (since it is a random access channel). In the case of a wideband CDMA (or "WCDMA") cellular system, the PRACH 39 provides 15 access slots per two radio frames, each access slot of approximately 1.33 milliseconds in length. In a preferred embodiment used in a wideband CDMA (or "WCDMA") cellular system, the PRACH 39 provides 15 access slots per two radio frames, each access slot of approximately 1.33 milliseconds in length. The WCDMA standard is described in general in H. Holma, A. Toskala, "WCDMA for UMTS", John Wiley & Sons, Sussex, England, 2000. Details of the structure of the PRACH are provided in 3rd Generation Partnership Project, "Technical Specification Group Radio Access Network; Physical channels and mapping of transport channels onto physical channels (FDD); (Release 5); 3GPP TS 25.211", September, 2002.

On the PRACH 39, for example, the message structure typically includes one or more preambles followed by a message. On the PRACH 39, for example, the message structure typically includes one or more preambles followed by a message. The preambles are typically one millisecond in duration while the messages may be ten or twenty milliseconds in duration which corresponds to one or two radio frames.

Each preamble is of length 4096 chips and has 256 repetitions of a signature of length of 16 chips.

In a preferred embodiment of the present invention for WCDMA systems, the PRACH is used to convey power control information from user equipments 40–45 to the radio sites 30 and 35. One of the preamble signatures is reserved for multimedia broadcast services power control. This preamble signature is P1 for particular access slot. Note that the P1 preamble is the same for all users for a given receiving radio site. A power control cycle is established on the PRACH. The power control cycle is composed of K access slots, where K may be varied. One of the access slots (typically the first) is reserved for MBMS power control. The access slots in the power control cycle are indexed numerically by one, two . . . K. In general, a power control signal is used to request greater broadcast channel power and the P1 preamble is an example of such a power control signal. In a preferred embodiment, the power control signal is the same waveform for all users transmitting to a particular radio site or sector.

Figure 2:
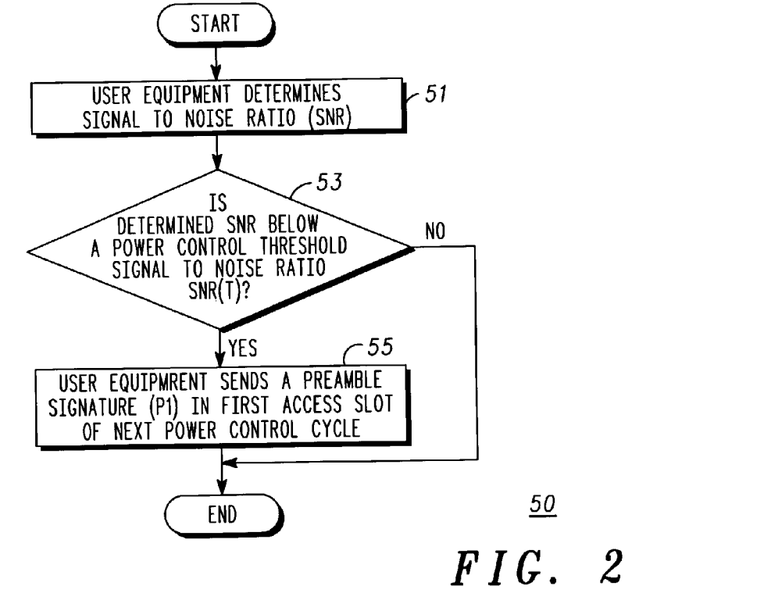
FIG. 2 is a flow chart of methodology for power control by user equipment in accordance with the present invention.

Use of the P1 preamble signature for implementing an embodiment of the present invention on the PRACH will be shown. Referring to FIG. 2, a flow chart of the operation carried out by a user equipment 40–45 to enable the preferred embodiment of the present invention is shown. The procedure is initiated and block 51 is entered. As each user equipment is receiving multimedia broadcast services, it determines a signal to noise ratio (SNR) for the received information, block 51.

Next, the user equipment determines whether the dynamically calculated signal-to-noise ratio (SNR) is below a power control threshold signal-to-noise ratio SNR(T), block 53. If the dynamically determined signal-to-noise ratio SNR is equal to or greater than the power control threshold SNR(T), block 53 transfers control via the no path to end process 50 without transmitting any preamble information to the radio site.

If the user equipment signal-to-noise ratio (which is dynamically determined) is below the power control threshold signal-to-noise ratio SNR(T), then block 53 transfers control to block 55 via the yes path. The user equipment then sends a preamble signature, P1, in a first access slot of the next power control cycle. That is, as previously mentioned, the power control cycle is composed of K access slots. These access slots are repeated 15 times every 20 milliseconds. Therefore, in slot 1 of the next repetition of access slots 1 through K of power control cycle, the power control signal (the P1 preamble) will be transmitted to the radio site by the user equipment on the PRACH 39, for example. Then block 55 ends process 50.

Figure 3:
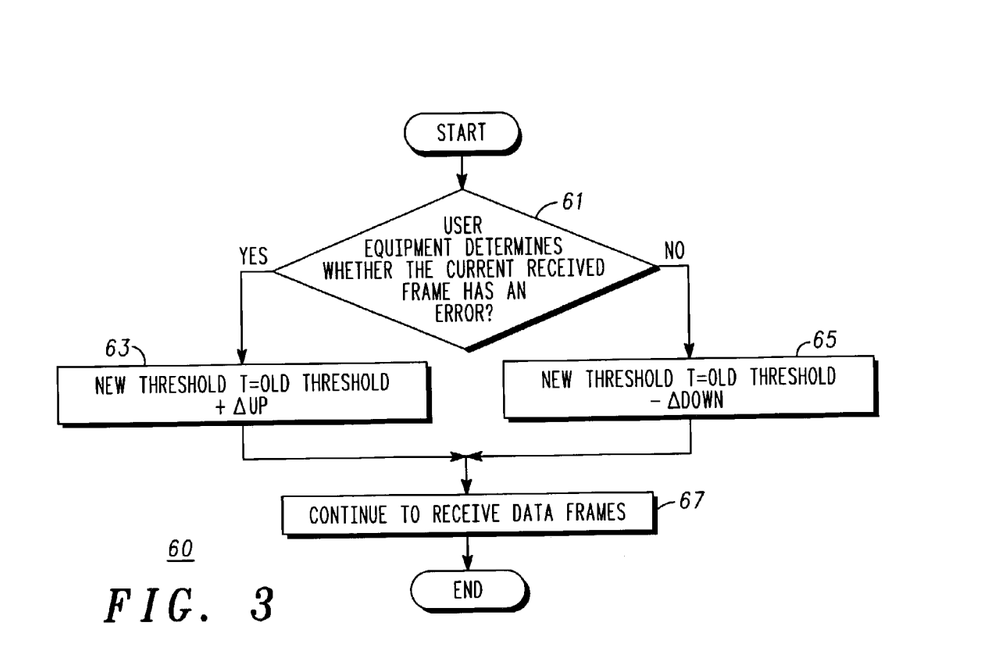
FIG. 3 is a flow chart of methodology for threshold setting in user equipment in accordance with the present invention.

Turning now to FIG. 3, a process for setting the signal-to-noise ratio for the power control threshold SNR(T) is shown in flow chart form.

Process 60 is initiated and block 61 is entered. Each user equipment determines whether the currently received frame has an error. This determination of block 61 is made at the end of each frame received by the user equipment. If there was an error in the frame then block 61 transfers control to block 63 via the yes path. The user equipment then calculates a new threshold T to be equal to the old threshold plus a $\Delta_{up}$. That is, the user equipment increases the threshold by a small amount for all future frames. Block 63 then transfers control to block 67. Block 67 continues to receive data frames and ends process 60.

If the user equipment determined that the current frame received has not been an error, block 61 transfers control to block 65 via the no path. Since there are no errors in the received frame, the user equipment establishes a new threshold T to be equal to the old threshold minus $\Delta_{down}$, block 65. That is the user equipment establishes a new threshold which is a relatively smaller signal-to-noise ratio threshold SNR(T). Block 65 then transfers control to block 67 to continue receiving data frames. Process 60 is then ended.

The ratio of up threshold changes to down threshold changes is a relatively flexible number. In a preferred embodiment, this ratio may be approximately 99. Expressed mathematically, the ratio is as follows:

$$\Delta_{up}/\Delta_{down}=99$$

Processes 50 and 60 of FIGS. 2 and 3 are performed by the user equipment. Previous power control methods required communication of power up and down commands to the radio network controller. In a preferred embodiment of the present invention, only power up requests are sent, and a single signal (the P1 preamble) is used by all user equipments to indicate the power up request. These requests are sent to the radio site and acted upon there as follows.

Figure 4:
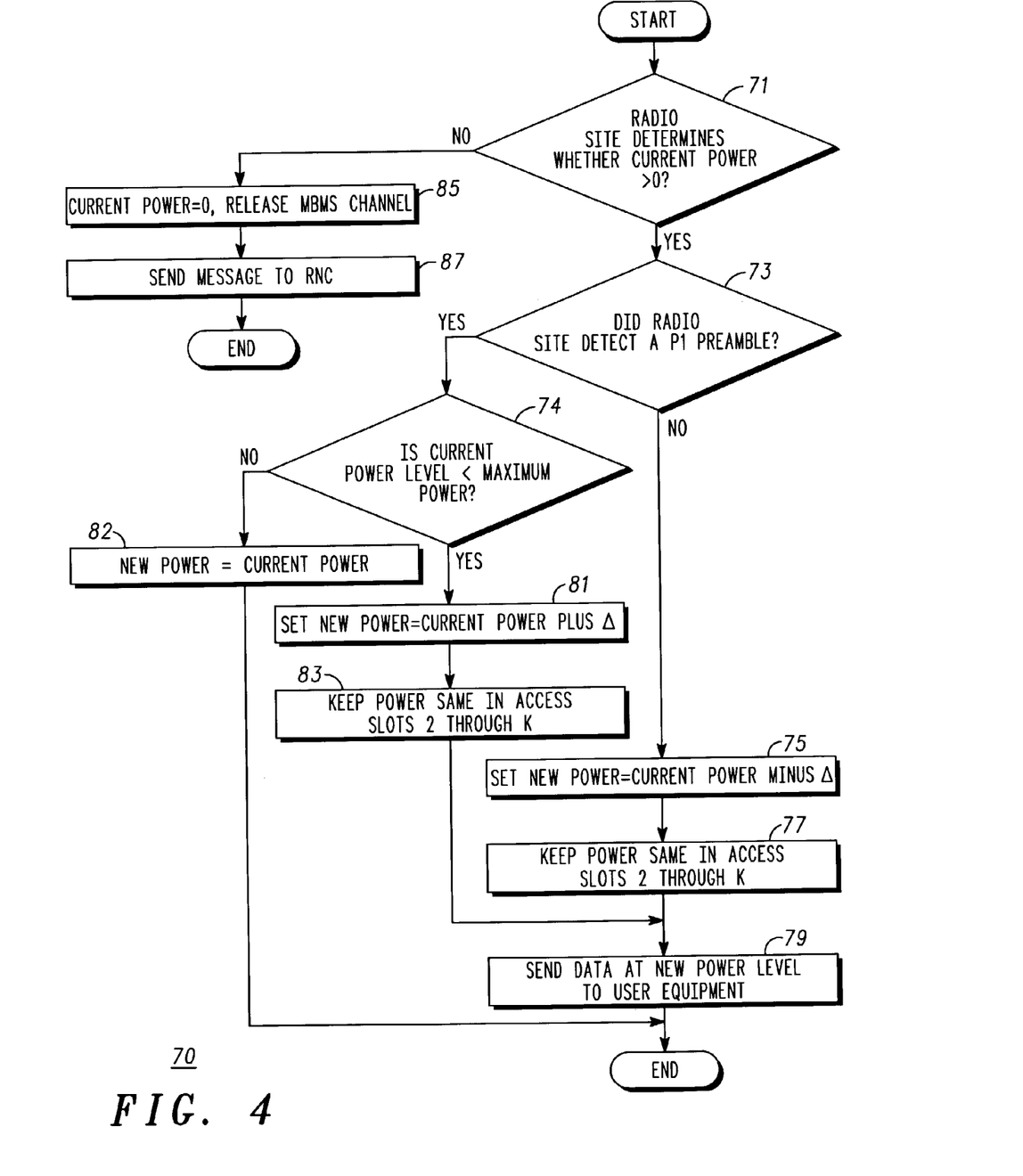
FIG. 4 is a flow chart of methodology for power control by radio sites in accordance with the present invention.

Referring now to FIG.4, a flow chart of the processing 70 or power control in the multimedia broadcast services is shown. Within the radio sites 30 and 35, process 70 is implemented for each user equipment receiving the broadcast channel. Process 70 is begun and block 71, receives control. In block 71, the radio site determines whether the current power level for a broadcast channel of a cell such as 36 is greater than zero.

If the power is greater than zero for a particular broadcast channel such as the link from cell 36 of radio site 35 to user 43, block 71 transfers control to block 73 via the yes path. Block 73 determines whether the radio site 35, for example, detected a P1 preamble on PRACH 39. Note that the power may not be increased by the radio site past the maximum allowable power. If no P1 preamble was received, block 73 transfers control to block 75 via the no path. The radio site then sets the new power equal to the current power minus a delta. This power change will be made at the end of the first access slot of the following power control cycle. Block 75 sets the new power equal to the current power less a delta amount. Next, the radio site transmits the broadcast channel with the same power in access slots 2 through K of the power control cycle, block 77. Then the radio site sends data on the broadcast channel to the user equipment at the new power level. Then process 70 is ended.

If a P1 preamble was received, then block 73 transfers control to block 74 via the yes path. Block 74 determines whether the current broadcast channel power level is less than the maximum power. If the power is not less than the maximum, it is at the maximum and block 74 transfers control to block 82 via the no path. Block 82 set the new power equal to the current power, which is the maximum power. Process 70 is then ended.

If the current power for a particular downlink used for multimedia services is less than its maximum power and the radio site detected a P1 preamble, block 74 transfers control to block 81 via the yes path. The radio site then sets the new power equal to the current power plus a delta amount, block 81. The radio site then keeps the power the same for access slots 2 through K, block 83. Then the radio site sends data on the broadcast channel to the user equipment at the new power level, block 79. Process 70 is then ended.

If the radio site determines that the current power for a particular channel or downlink is zero, block 71 transfers control to block 85 via the no path. Zero power indicates that a particular link is no longer in use. The radio site then releases the multimedia multicast service link or channel, block 85. Next the radio site sends a message to the radio network controller to release the corresponding link between the radio site and the RNC, block 87. Process 70 is then ended.

Figure 5:
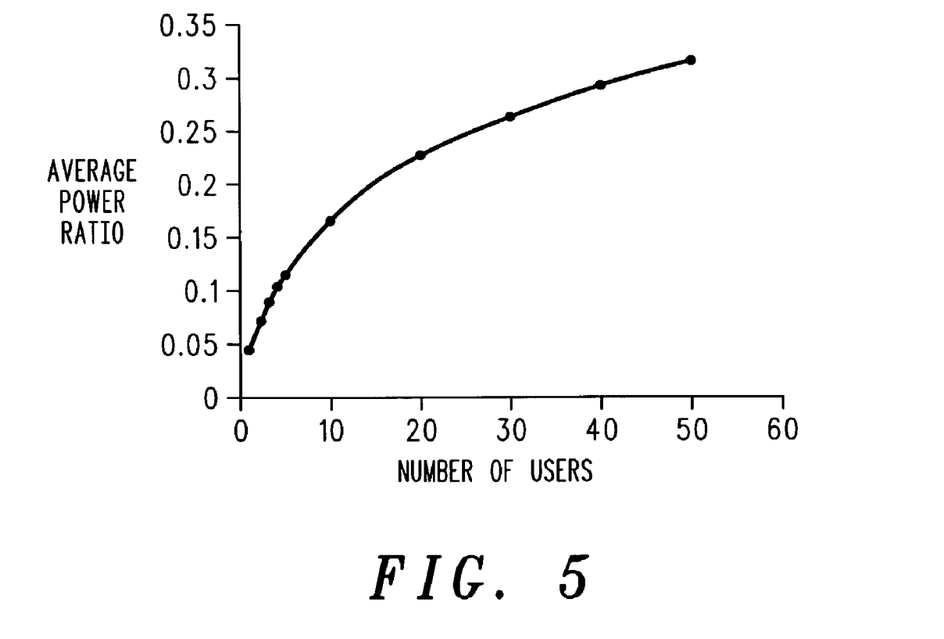
FIG. 5 is a diagram depicting average power ratio versus number of users in accordance with the present invention.

Referring to FIG. 5, simulation results are shown for the relationship between the number of users and an average power ratio for a preferred embodiment of the invention. As can be seen, the power control method embodied in the present invention reduces the average power consumed by the multimedia broadcast downlink channel even when the number of users is relatively large.

Figure 6:
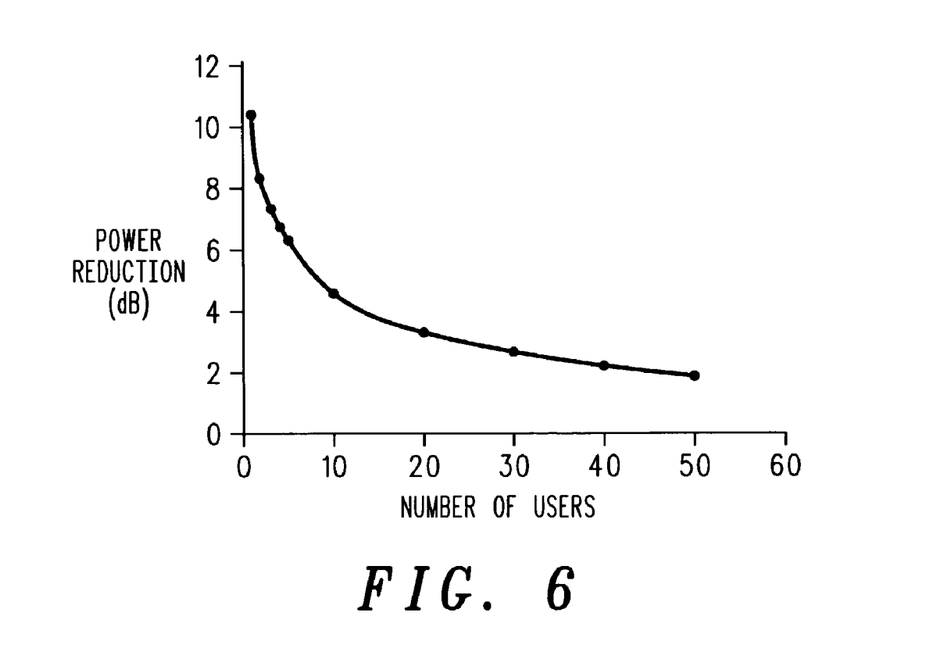
FIG. 6 is a diagram depicting power reduction versus the number of users in accordance with the present invention.

FIG. 6 is a diagram depicting a relationship between power reduction in dB and the number of users. For the above simulation results, the inputs were as follows: 19 cell sites, 2 multipath fading channels, a speed of 3 km/h; and a spreading factor of 64.

Figure 7:
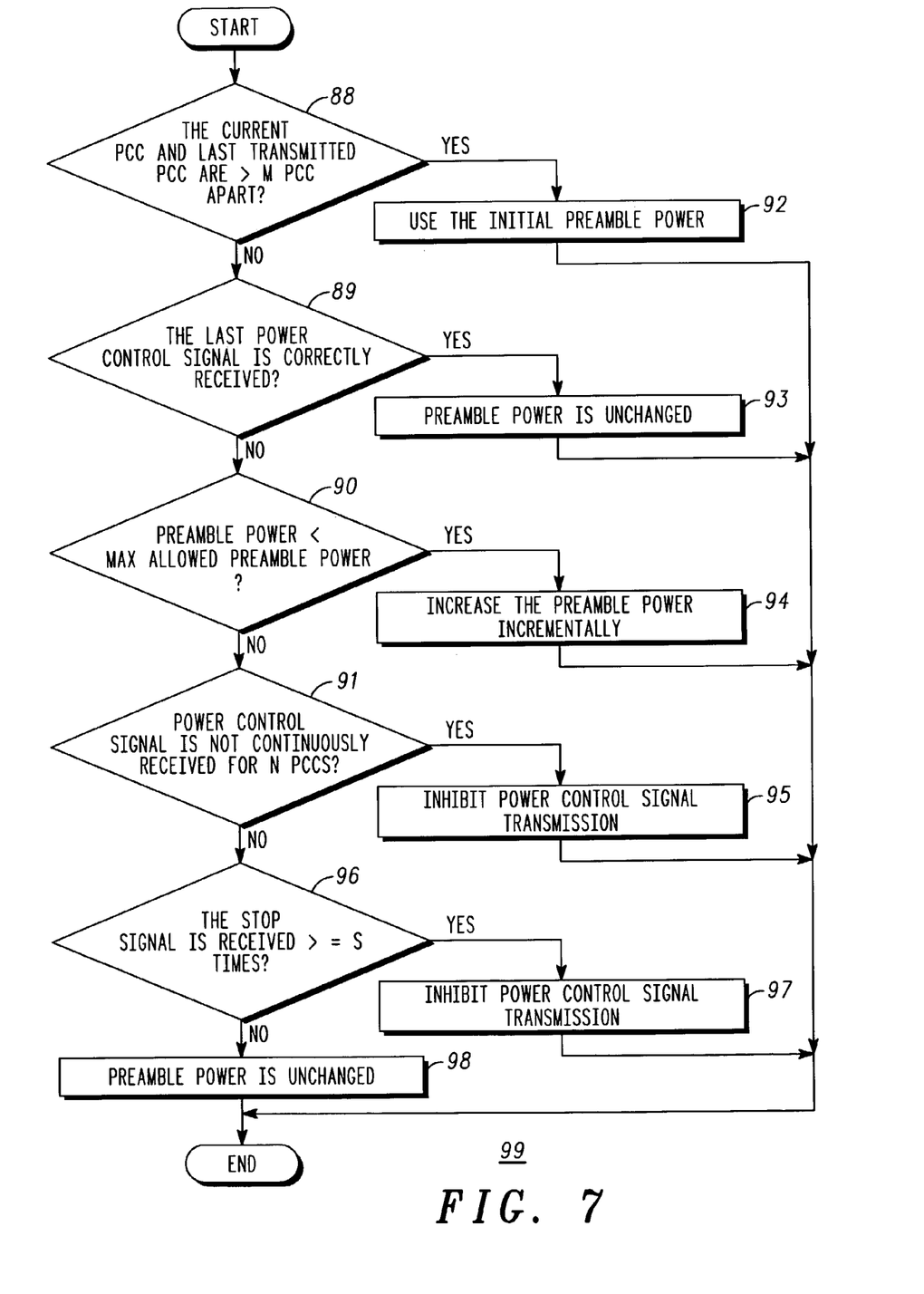
FIG. 7 is a flow chart of methodology for power control by radio sites in accordance with the present invention.

Referring now to FIG. 7, a flowchart of the processing 99 or the preamble power control in the user equipment is shown. Process 99 is implemented in each user equipment. The procedure is initiated and block 88 receives control. In block 88, the user equipment will determine whether the current PCC (power control cycle) and the last transmitted PCC is greater than M PCCs apart. If so, block 88 transfers control to block 92 via the yes path. In block 92, the user equipment uses the pre-set initial preamble power to transmit the power control signal. Then process 99 is ended.

If the user equipment determines that the current PCC and the last transmitted PCC is less than M PCCs apart, then block 88 transfers control to block 89. In block 89, the user equipment determines whether the last transmitted power control signal is correctly received by the radio site. If so, block 89 transfers control to block 93 via the yes path. In block 93, the user equipment does not change the preamble power and uses the current preamble power level to transmit the power control signal to the radio site. Then process 99 is ended.

If the user equipment determines that the last transmitted power control signal is not received by the radio site, then block 89 transfers the control to block 90. In block 90, the user equipment determines whether the current preamble power is less than the pre-defined maximum allowed preamble power. If so, block 90 transfers control to block 94 via the yes path. In block 94, the user equipment uses the last transmitted preamble power level plus an incremental increase in power to transmit the power control signal to the radio site. Then process 99 is ended.

If the user equipment determines that the current preamble power is not less than the pre-defined maximum allowed preamble power, then block 90 transfers the control to block 91. In block 91, the user equipment determines whether the transmitted power control signal is not continuously received by the radio site for N PCCs. If so, the block 91 transfers control to block 95 via the yes path. In block 95, the user equipment will inhibit the transmission of the power control signal to the radio site. Then the process 99 is ended.

If the user equipment determines that the transmitted power control signal is not continuously received by the radio site for less than N PCCs, then the block 91 transfers the control to block 96. In block 96, the user equipment will determine whether the "stop" signal is received from the radio site for more than S times. As described below, the radio site will transmit the "stop" signal to the user equipments, if it detects the uplink interference caused by the power control signal is significant. If so, the block 96 transfers control to block 97 via the yes path. In block 97, the user equipment will inhibit transmission of the power control signal to the radio site. Then the process 99 is ended.

If the user equipment determines that the "stop" signal from the radio site is received for less than S times, then the block 96 transfers the control to block 98. In block 98, the user equipment will keep the preamble power unchanged and use that power level to transmit the power control signal to the radio site. Then the process 99 is ended.

For block 89, the user equipment may determine whether the power up command has been successfully received by various means. In the preferred embodiment, the radio site will transmit an acknowledgement that the command was received. In a preferred embodiment for use with WCDMA cellular systems, the acquisition indicator channel (the "AICH") is used. The operation of this indicator channel is described in the WCDMA specifications, including: 3rd Generation Partnership Project, "Technical Specification Group Radio Access Network; Physical layer procedures (FDD); (Release 5); 3GPP TS 25.214", March, 2003. After transmitting a power up command in an access slot associated with power control transmission, the user equipment will attempt to detect a positive acquisition indicator in the downlink slot associated with the uplink power control transmission slot. If the positive acquisition indicator is detected, the user equipment is then aware that the power control was successfully received at the radio site.

In a second embodiment, the user equipment may observe the power level of the broadcast channel. If the broadcast channel power received at the user equipment increases (relative to a pilot channel, which is continuously transmitted at a constant power) in the time slot corresponding to a power up request by the user equipment, the user equipment is aware that the power control command was successfully received at the site.

For block 96, it may also be desirable for the radio site to inhibit users from transmitting power control commands if the users produce an excessive amount of interference. In this case, the radio site may transmit a signal indicating to the user equipments that excessive transmit power is being received. In a preferred cellular WCDMA embodiment, the radio site will transmit a negative acquisition indicator in the radio slots corresponding to uplink power control commands where excessive interference is received. User equipments that transmitted during the radio slots associated with the negative acquisition indicator that successfully decode the negative acquisition indicators will cease transmission after receiving a predetermined number S of negative acquisition indicators.

The user equipment 40–45 may be able to receive a broadcast channel from more than one cell (radio site 30, 35 or sector of a radio site). This is often referred to as simulcast, or in cellular CDMA systems, soft handoff. In this case, the user equipment will need to decide which cell or cells to transmit the power control commands to. In a preferred embodiment, the user selects one cell to transmit the command to for one or more power control cycles. The power control signals are varied to indicate which cell the power control command is intended for. In a preferred embodiment for cellular WCDMA systems, the PRACH preamble P1 is scrambled with a scrambling code associated with the intended receiving cell. The cell with the greatest received power is selected for power control. The cells may be selected no more than once per power control cycle.

Figure 8:
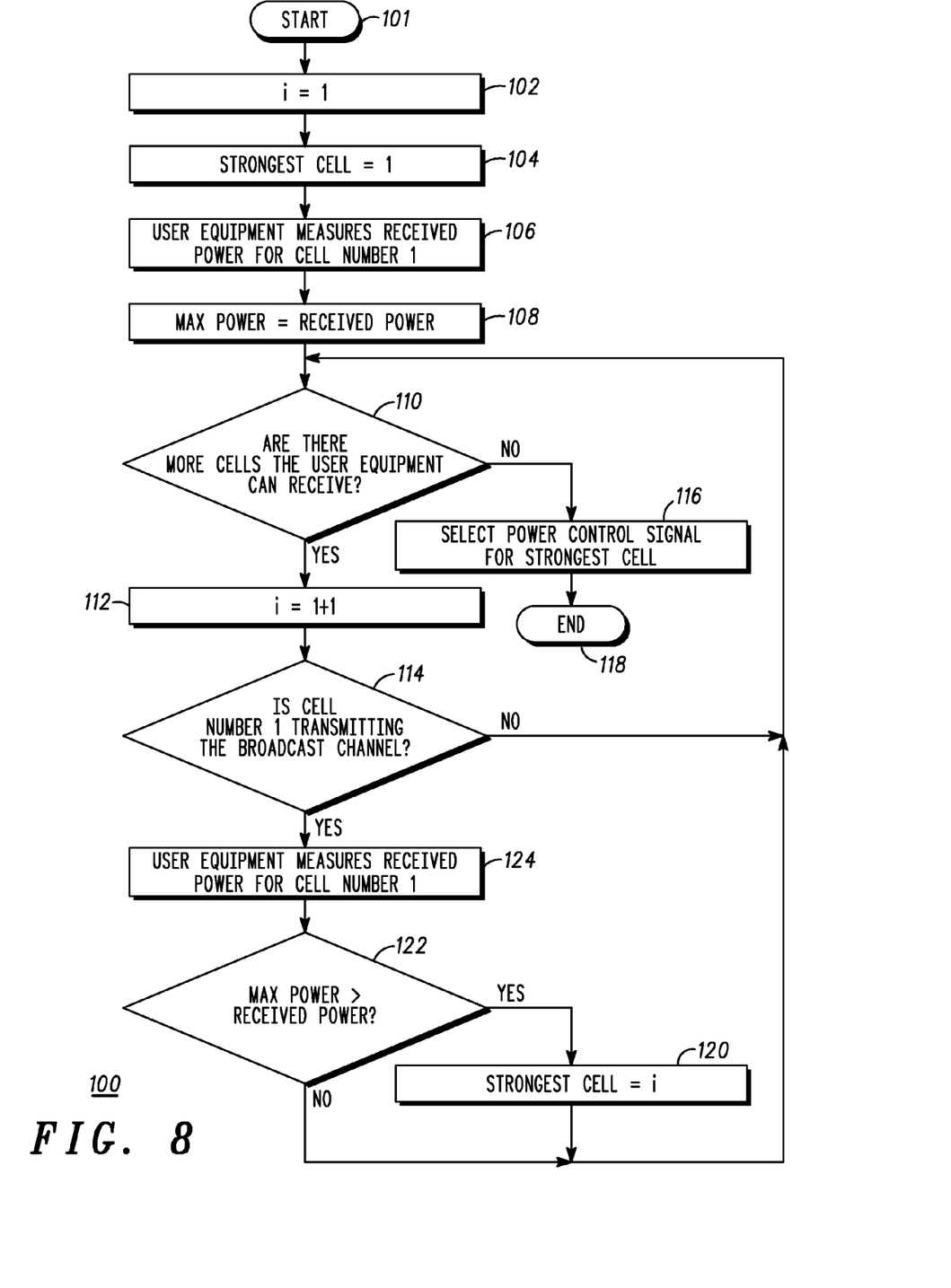
FIG. 8 is a flow chart of methodology for power control by user equipment in accordance with the present invention.

Referring to FIG. 8, process 100 is used in the preferred embodiment to decide which cell or cells to transmit the power control signal to. The process is initiated with block 101. In block 102 a cell index i is set to 1. Next in block 104, the strongest cell variable that indicates which cell among those measured by the user equipment is set to 1. The process moves to block 106, where the user equipment measures the received power level of cell number 1, setting the variable Received Power equal to the measured power level. Next in block 108, the Max Power variable is initialized to the Received Power variable measured from the first cell. The Max Power variable tracks the maximum power level of all cells measured. The process moves on to block 110, where the user equipment tests if there are additional cells at sufficient power such it may receive from them. If there is there are more cells the user equipment can receive, the process moves to block 112. If the test in block 110 finds that there are no more cells the user equipment can receive, the process moves on to block 116.

In block 112, the cell index i is incremented. The process moves from block 112 to block 114, which tests if cell number i is transmitting a broadcast channel the user equipment wishes to power control. If cell number i is transmitting a broadcast channel it wishes to control, then the process moves on to block 124. If not, the process returns to block 110.

In block 124, the user equipment measures the received power level of cell number 1, setting the variable Received Power equal to the measured power level. The process then moves from block 124 to block 122. In block 122, the process tests if the received power level just measured in block 124 is greater than the maximum power observed for all cells. If the received power is greater than the maximum power measured so far, the process moves on to block 120. If it is not greater, then the process returns to block 110. In block 120, the strongest cell variable is set to the index number i of the cell whose power was just measured in block 124. The process then returns from block 120 to block 110.

In block 116, the cell the user equipment wishes to transmit to is selected. The user equipment selects a power control signal associated with the intended serving cell. For the preferred WCDMA embodiment, the power control signal associated with the intended serving cell is a PRACH preamble P1 scrambled with a scrambling code associated with the selected receiving cell.

As explained above in the preferred embodiment of the invention, a power control method for a physical random access channel (PRACH) overcomes the disadvantages of the prior art and provides the following advantages. Since a single power control method is shown, no point-to-point/point-to-multipoint transitions are required by the radio site. Therefore, a single, unified, mode of operation enabled for both a small and a large number of users is provided by this invention. By avoiding the transmission of a dedicated channel, the battery power of the user equipment is substantially reduced.

The RNC is not required to track and count multimedia users. This saves substantial system overhead.

Only the radio sites respond to power control request commands. The RNC is not involved in the power control cycle thereby saving a substantial amount of overhead.

As a result of this power control methodology on the PRACH, no dedicated channels are needed for the user equipment for multimedia broadcast services. As a result mobile telecommunication resources are saved.

Since power control commands are transmitted on a random access channel, any user equipment may request additional power without requesting access to the network. This speeds up the power control rate by avoiding the delays needed for access requests.

Also, since the same signal is used as a power up commands by all users, and since users may simultaneously transmit the commands, the radio site may more reliably detect that a power up command has been transmitted. This is because the power from the multiple users transmitting the same power up commands simultaneously combines at the radio site, increasing the received signal to noise ratio.

This power control method is implemented on the physical layer of system software and processing. Thereby signaling overhead such as transmitting measurement reports and sending them on the uplink to the RNC is eliminated. Lastly, the overhead to the PRACH for P1 preamble messages is relatively small, since only those users requiring power transmit power control commands, and since each PRACH command requires little power to be received reliably.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A power control method for a broadcast channel in a mobile telecommunication system, said power control method comprising the steps of:
   providing a physical random access channel (PRACH) coupled between a radio network and a plurality of user equipment;

selectively transmitting a power control signal on the PRACH from each of at least two user equipment of the plurality of user equipment;

simultaneously receiving the power control signals from the at least two user equipment as a single network power control signal;

selectively adjusting a power level of the broadcast channel in response to the single network power control signal; and retaining a current power of the broadcast channel in access slots 2 through K of a next power control cycle, where K is a number of access slots in the next power control cycle.

2. The power control method as claimed in claim 1, wherein the step of providing a PRACH includes the step of providing a radio site coupled directly to the plurality of user equipment and providing a radio network controller coupled to the radio site.

3. The power control method as claimed in claim 2, wherein the step of selectively transmitting the power control signal includes the step of determining by the at least two user equipment a dynamic signal-to-noise ratio of data transmitted from the radio site to the at least two user equipment.

4. The power control method as claimed in claim 3, wherein the step of selectively transmitting a power control signal further includes a step of determining by the at least two user equipment whether the dynamic signal to noise ratio is less than a predetermined threshold signal-to-noise ratio.

5. The power control method as claimed in claim 4, wherein if the dynamic signal-to-noise ratio is less than the predetermined threshold signal-to-noise ratio, there is further included a step of transmitting the power control signal by the at least two user equipment in a first access slot of a next power control cycle.

6. The power control method as claimed in claim 4, wherein if the dynamic signal-to-noise ratio is greater than or equal to the predetermined threshold signal-to-noise ratio, there is further included a step of inhibiting transmitting of the power control signal in a first access slot of the next power control cycle.

7. The power control method as claimed in claim 6, wherein there is further included a step of determining by the radio site whether the current power of the broadcast channel is greater than zero, the broadcast channel coupling the radio site to the at least two user equipment.

8. The power control method as claimed in claim 7, wherein if the current power is greater than zero, there is further included a step of determining by the radio site whether the power control signal is detected and determining whether the current power is less than a maximum power for the broadcast channel.

9. The power control method as claimed in claim 8, wherein if the radio site does not detect a power control signal and the current power is less than the maximum power, there is further included a step of setting a new power equal to the current power less a predetermined decrement.

10. The power control method as claimed in claim 1, wherein there is further included a transmitting data on the broadcast channel with the new power.

11. The power control method as claimed in claim 8, wherein if the radio site determines that a power control signal is detected and the current power is less than the maximum power, there is further included a step of setting by the radio site a new power equal to the current power plus an increment.

12. The power control method as claimed in claim 7, wherein if the radio site determines that the current power is not greater than zero, there is further included steps of:
releasing the broadcast channel by the radio site; and
sending by the radio site a release message.

13. The power control method as claimed in claim 4, wherein there is further included a step of determining by at least one of the at least two user equipment whether a current received frame of data has an error.

14. The power control method as claimed in claim 13, wherein if the current received frame of data has an error, there is further included the steps of:
setting a new predetermined threshold signal-to-noise ratio equal to the predetermined threshold signal-to-noise ratio plus an incremental amount; and
continuing to receive frames of data.

15. The power control method as claimed in claim 13, wherein if at least one of the at least two user equipment determines that the current data frame does not have an error, there is further included the steps of:
setting a new predetermined threshold signal-to-noise ratio equal to an old predetermined threshold signal-to-noise ratio less a decremental amount; and
continuing to receive data frames.

16. The power control method as claimed in claim 2, wherein there is further included a step of providing the broadcast channel between the radio site and at least one of the at least two user equipment for point-to-point data broadcast.

17. The power control method as claimed in claim 2, wherein there is further included a step of providing a multimedia broadcast channel between the radio site and the at least two user equipment for point-to-multipoint data broadcast.

18. The power control method as claimed in claim 2, wherein there is further included a step of selecting the power control signal from a set of possible power control signals depending upon a radio site from which the broadcast channel is transmitting.

19. The power control method as claimed in claim 2, wherein there is further included a step of adjusting a transmit power of the power control signal.

20. The power control method as claimed in claim 2, wherein there is further included steps of:
determining by the radio site that a power control command was correctly received by receiving a positive acquisition indicator transmitted on an access indicator channel; and
adjusting a transmit power of the power control signal.

21. The power control method as claimed in claim 2, wherein there is further included a step of inhibiting by at least one of the at least two user equipment transmission of the power control signal after receiving at least one control command from the radio site.

22. The power control method as claimed in claim 21, wherein the at least one control command is a negative access acquisition indicator transmitted on an access indicator channel.

23. A power control method for broadcast services in a mobile telecommunication system including a radio network controller, the power control method comprising the steps of:
providing a physical random access channel (PRACH) coupled between a radio site of the mobile telecommunication system and at least two user equipment of a plurality of user equipment;
providing a broadcast channel coupled between the radio site and the at least two user equipment, the radio site for transmitting point-to-point and point-to-multipoint data to the at least two user equipment;

transmitting from the at least two user equipment an identical power control signal so as to be received simultaneously by the radio site as a single signal;

determining by the radio site whether the single signal is detected;

if the single signal is detected and a current power is less than a maximum power, incrementing the current power by a first amount to produce a new power;

if the single signal is not detected, decrementing the current power by a second amount to produce the new power;

transmitting data on the broadcast channel with the new power; and retaining the current power in access slots 2 through K of a next power control cycle, where K is a number of access slots of the next power control cycle.

24. The power control method as claimed in claim 23, wherein if the radio site determines that the current power is not greater than zero, there is further included steps of:

releasing the broadcast channel by the radio site; and sending by the radio site a release message.

* * * * *